United States Patent [19]

Taylor

[11] 4,256,614
[45] Mar. 17, 1981

[54] NOVEL OXIME POLYMERS AND PROCESS FOR PREPARING SAME

[75] Inventor: Lloyd D. Taylor, Lexington, Mass.

[73] Assignee: Polaroid Corporation, Cambridge, Mass.

[21] Appl. No.: 91,067

[22] Filed: Nov. 5, 1979

Related U.S. Application Data

[60] Division of Ser. No. 894,545, Apr. 7, 1978, Pat. No. 4,202,694, which is a continuation-in-part of Ser. No. 789,422, Apr. 21, 1977, abandoned.

[51] Int. Cl.³ .............................................. C08L 1/28
[52] U.S. Cl. .................................. 260/17 A; 526/312; 526/316; 526/317; 430/215; 525/359; 525/369; 525/377
[58] Field of Search ..................... 525/380, 359, 369; 260/17 A

[56] References Cited

U.S. PATENT DOCUMENTS

| | | | |
|---|---|---|---|
| 2,959,574 | 11/1960 | Woodberry | 260/85.5 |
| 2,962,477 | 11/1960 | Blanchette | 260/63 |
| 3,063,950 | 11/1962 | Schouteden | 260/2.1 |
| 3,063,951 | 11/1962 | Schoutedan | 260/2.1 |
| 3,088,799 | 5/1963 | Fetsther | 23/14.5 |
| 3,293,216 | 12/1966 | Norman | 260/67 |
| 3,328,357 | 6/1967 | Lashua | 260/77.5 |
| 3,362,822 | 1/1968 | Haas et al. | 96/290 |
| 3,488,329 | 1/1970 | Johnson | 260/78.5 |
| 3,575,701 | 4/1971 | Taylor | 526/52 |
| 3,647,437 | 3/1972 | Land | 96/3 |
| 3,706,715 | 12/1972 | Brack | 260/77.5 AC |
| 3,711,446 | 1/1973 | Brack | 260/77.5 AC |
| 3,790,549 | 2/1974 | Feniak | 260/94.8 |
| 3,880,822 | 4/1975 | Perrotti et al. | 260/94.7 N |
| 3,963,791 | 6/1976 | Giuffre | 526/22 |
| 4,085,261 | 4/1978 | Patchornik et al. | 526/19 |
| 4,202,694 | 5/1980 | Taylor | 430/215 |

OTHER PUBLICATIONS

"Polyvinylacetophenone:Preparation, Reactions and Depolymerization," Kenyon et al., *J. of Polymer Science*, vol. XXXII, 1958, pp. 83–88.
"Polyacrylamidoximes", Schouteden, *Makro. Chemie 24*, 1957, pp. 25–49.
"On The Conversion of Amidoxime", Schouteden, *Makromoleculas Jour. of Polymer:Polymer Chemistry Edition*, vol. 12, 2553–2566 (1974) Hong et al.

*Primary Examiner*—Edward M. Woodberry
*Attorney, Agent, or Firm*—Louis G. Xiarhos

[57] ABSTRACT

Novel photographic processing compositions including a polymeric oxime viscosity-increasing reagent for processing an exposed film unit to provide a photographic image. While this photographic image may be in black-and-white or in color and prepared by any of the heretofore known systems, of particular interest are color diffusion transfer systems for preparing a color image viewable without separation of any of the components or layers of the photographic product. The invention also includes a novel class of polymeric oximes which may be employed in such compositions.

14 Claims, 2 Drawing Figures

NOVEL OXIME POLYMERS AND PROCESS FOR PREPARING SAME

CROSS-REFERENCE TO RELATED APPLICATION

This application is a division of my earlier filed and copending application Ser. No. 894,545, filed Apr. 7, 1978 now U.S. Pat. No. 4,202,694, issued May 13, 1980, which in turn is a continuation-in-part of my earlier filed and copending application Ser. No. 789,422, filed Apr. 21, 1977, and now abandoned.

BACKGROUND OF THE INVENTION

A great number of photographic processes have heretofore been known wherein development of the exposed film unit is accomplished by applying to the exposed film unit a processing composition including a viscosity-increasing reagent to facilitate spreading of the composition, e.g., a film-forming material such as hydroxyethyl cellulose or carboxymethyl cellulose, etc., high molecular weight polymers which form a relatively firm and stable film.

Typical of such known processes are silver diffusion transfer systems for forming a transfer image (usually a "positive") in silver; and color diffusion transfer systems wherein a dye transfer image (also usually a "positive") is formed.

In a conventional silver diffusion transfer system of the foregoing description, an exposed silver halide layer containing a developable image is developed by applying a viscous processing composition, typically an aqueous alkaline composition including a silver halide developing agent and a silver halide solvent, to develop the exposed silver halide and as a function thereof to form an imagewise distribution of a soluble silver complex which is transferred at least in part, to form a positive black-and-white image in silver.

Color transfer images are typically formed by exposing a photosensitive element including at least one light-sensitive silver halide layer having a dye image-providing material associated therewith, contacting the thus exposed element with a viscous processing composition, usually an aqueous alkaline composition, to develop the exposed photosensitive element and as a function thereof providing a differential in solubility or diffusibility of the associated dye image-providing material, thus providing an imagewise distribution of more soluble or diffusible dye image-providing material which is then transferred to a dyeable stratum to impart thereto a dye transfer image. The dyeable stratum may be contained on the photosensitive element or on a separate element referred to as an image-receiving element. Dye image-providing materials employed in these color processes generally may be characterized as either (1) initially soluble or diffusible in the processing composition but are selectively rendered non-diffusible in an imagewise pattern as a function of development; or (2) initially insoluble or non-diffusible in the processing composition but which are selectively rendered diffusible in an imagewise pattern as a function of development. These materials may be complete dyes or dye intermediates, e.g., color couplers.

As examples of initially soluble or diffusible materials and their application in color diffusion transfer, mention may be made of those disclosed, for example, in U.S. Pat. Nos. 2,647,049; 2,661,293; 2,698,244; 2,698,798; 2,802,735; 2,774,668 and 2,983,606. As examples of initially non-diffusible materials and their use in color transfer systems, mention may be made of the materials and systems disclosed in U.S. Pat. Nos. 3,443,939; 3,443,940; 3,227,550; 3,227,551; 3,227,552; 3,227,554; 3,243,294; and 3,445,228.

In any of these color systems, multicolor images may be obtained by employing a film unit containing at least two selectively sensitized silver halide layers each having associated therewith a dye image-providing material exhibiting desired spectral absorption characteristics. The most commonly employed elements of this type are the so-called tripack structures employing a blue-, a green- and a red-sensitive silver halide layer having associated therewith, respectively, a yellow, a magenta and a cyan dye image-providing material.

The foregoing description is illustrative of the various kinds of photographic systems heretofore known which employ viscous processing reagents. Such systems include both black- and white and color, reflection prints and transparencies, so-called peel apart systems wherein the receiving element containing the image is separated from the negative element, and so-called integral systems wherein the respective elements are retained together subsequent to image formation.

Many materials have previously been suggested for use as the viscosity-increasing agent. For example, U.S. Pat. Nos. 2,543,181; 2,558,857; 2,616,807; 2,662,822; 2,983,606; 3,415,644; 3,594,164; 3,594,165 and others mention the use of such materials as sodium carboxymethyl cellulose, hydroxyethyl cellulose, sodium alginate, certain starches and gums, and the like. Many additional patents are directed to various problems with such viscous processing reagents. For instance, U.S. Pat. No. 3,362,822 is directed to the addition of a polymeric substance which is soluble in the alkaline composition but precipitates at a lower pH of 7–11, e.g. a polymeric acid having an ionization constant between about $10^{-6}$ and $10^{-12}$, in order to accelerate the setting time of the layer of processing composition; U.S. Pat. No. 3,390,990 relates to the use of a cross-linking agent for the polymeric viscosity-increasing reagent in order to obtain denser transfer images along with a reduction in the amount of viscosity-increasing compound; U.S. Pat. No. 3,776,726 describes and claims the addition of colloidal silica to increase the viscosity, etc.

SUMMARY OF THE INVENTION

The present invention is directed to photographic film units and systems, e.g. any of the known film units and systems, employing a viscous processing composition to effect development and image formation, the essence of the invention being employing in the composition a polymeric oxime, i.e., a polymer containing a substituent, as viscosity-increasing reagent, alone or in combination with another viscosity-increasing reagent. The preferred polymeric oximes (including the novel polymers mentioned hereinafter) are those characterized as having a high pKa, e.g., at least about 12. The polymeric oximes contemplated by this invention include novel polymers including on the polymeric backbone a substituent of the formula:

wherein each $R^1$ is alkyl of 1–6 carbon atoms, preferably methyl or ethyl; "alkylene" is of 1–8 carbon atoms and may be straight or branched chain; $R^2$ is hydrogen, amino, phenyl or alkyl of 1–4 carbon atoms; and m is 1 or 2. It will be understood that where m is 1, the "alkylene" moiety is not present.

DESCRIPTION OF PREFERRED EMBODIMENT.

The invention is particularly directed to color diffusion transfer systems of the newer generation wherein the exposed film unit is developed with a viscous processing composition including a pigment or opacification dye to provide a color reflection print viewable without separation of any of the layers and components and the invention will accordingly be described hereinafter by reference to such film units.

Photographic systems for forming color reflection prints viewable without separation have recently achieved great recognition in the art. Generally speaking, film units for use in such systems comprise a "negative" component and a "positive" component sandwiched between two outer dimensionally stable elements or supports, at least one of which is transparent for viewing the resulting image. The negative component includes the silver halide stratum or strata with associated dye image-providing material; and the positive component includes at least a dyeable stratum where the color transfer image is formed. In addition to the aforementioned essential layers, such film units further include means for providing a reflecting layer, typically a white pigment layer, between the dyeable stratum and the negative component in order to mask effectively the silver image or images formed as a function of development of the silver halide layer or layers and any remaining associated dye image-providing material and to provide a background for viewing the color image formed in the dyeable stratum, without separation, by reflected light. This reflecting layer may comprise a preformed layer of a reflecting agent included in the essential layers of the film unit or the reflecting agent may be provided after photoexposure, e.g. by including the reflecting agent in the processing composition. It will be appreciated that the film unit may and will typically also contain other layers preforming specific desired functions, e.g. spacer layers, pH-reducing layers, etc.

Figure 1:
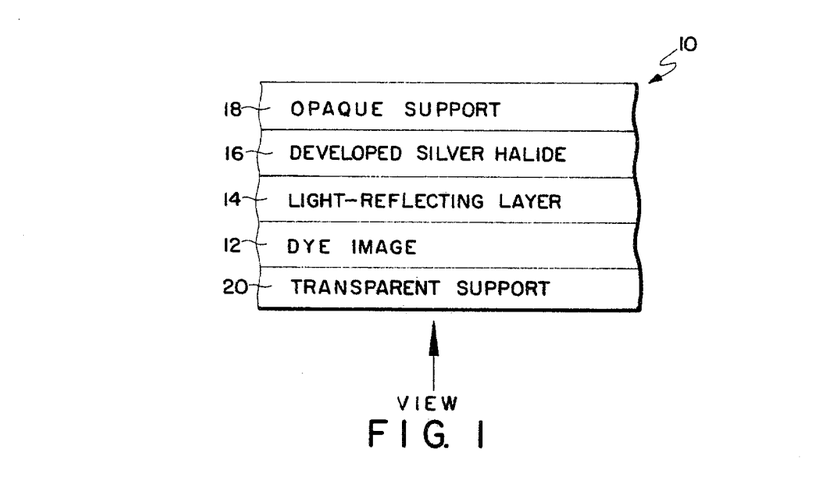
FIG. 1 is a diagrammatic enlarged schematic illustration of a diffusion transfer dye image formed in accordance with one film unit and photographic system contemplated by this invention.

One such film unit is shown schematically in FIG. 1 after exposure and dye image formation. The resulting dye image 12 in an image-receiving or image-carrying layer 12 is viewable through transparent support 20. Light-reflecting layer 14 which masks the negative image and provides the background for viewing the dye image preferably comprises a white pigment. While layer 14 may comprise a preformed layer of the film unit, e.g. in accordance with the teachings of U.S. Pat. No. 3,415,645; 3,615,421 or 3,661,585, it is preferably formed by application of an aqueous dispersion thereof subsequent to photoexposure, e.g. as disclosed in U.S. Pat. No. 3,473,925 or 3,415,644. Most preferably, the pigment is included in the processing composition as set forth in the aforementioned U.S. Pat. No. 3,415,644. While only one silver halide layer 16 is shown (it being understood that in this simple schematic illustration a layer of dye image-providing material is associated therewith in the same or an adjacent layer), in multicolor embodiments "layer" 16 would comprise a plurality of silver halide strata arranged in overlying coplanar relationship or in a side-by-side or screen-like arrangement as is well known in the art. A dye image-providing material providing a dye having a color complementary to the light by which the associated silver halide emulsion is exposable may be associated with each such silver halide strata, as is well known in subtractive color processes. An opaque support 18 completes the film unit 10. In a typical film unit of this structure, a rupturable container or "pod" of processing composition is positioned so as to be capable of spreading its contents (the processing composition) in a layer between the two support layers, e.g. between layers 12 and 16.

It will be understood that the elements of the film may be superposed and comprise an integral film unit during photographic exposure, i.e. exposure being effected through the transparent support 20 as shown, for example, in the aforementioned U.S. Pat. No. 3,415,644. Alternately, the image-receiving layer 12 and its transparent support 20 may be separated from the photosensitive layers during exposure, the resulting laminate 10 being formed by the superposing of the respective elements with a processing composition containing a light-reflecting pigment distributed therebetween, as described, for example, in U.S. Pat. No. 2,983,606.

If the film unit is to be processed outside of a dark chamber, i.e. if it is to be removed from the camera prior to image completion and while the film is still photosensitive, appropriate opacifying reagents and/or layers should be provided. A particularly useful opacifying system for film units providing integral prints of the type shown in FIG. 1 and in the aforementioned U.S. Pat. No. 3,415,644 utilizes a color dischargeable reagent, preferably a pH-sensitive optical filter agent or dye, as is described in detail in U.S. Pat. No. 3,647,437.

Figure 2:
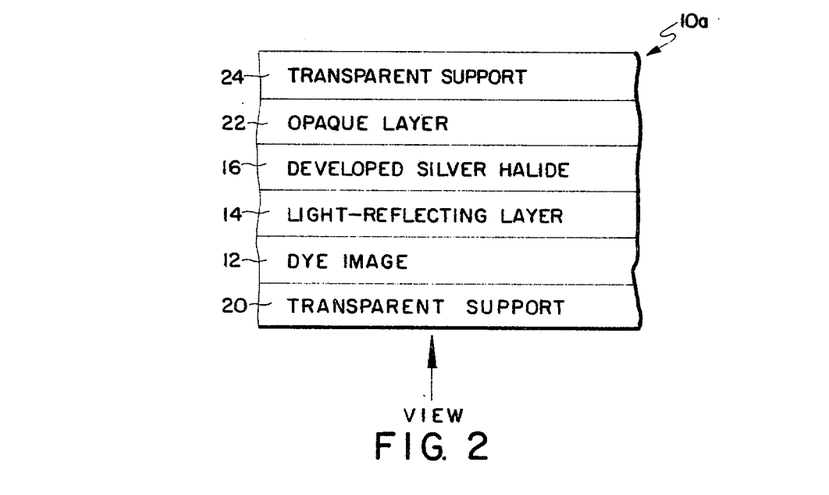
FIG. 2 is a similar schematic illustration of a diffusion transfer dye image formed with another film unit and photographic system contemplated by this invention.

FIG. 2 illustrates another kind of film unit wherein exposure is effected from the side opposite the side from which the image is viewed, and an appropriate opaque layer 22 is provided over the silver halide layer(s) 16. This may be done by distributing a processing composition providing this opaque layer, e.g., containing carbon black, between photosensitive layer(s) 16 and the transparent support 24 through which photoexposure is effected. Alternatively, opaque layer 22 may be omitted and light-protection provided by an opaque layer (not shown) superposed over the transparent support 24 or directly over the photosensitive layer 16 after exposure.

In the preferred film units for obtaining integral negative-positive reflection prints of the type shown in FIG. 2, photoexposure is effected through transparent support 24 and opaque layer 22 which protects the exposed silver halide from further exposure may be provided by including a light-absorbing opacifying agent, e.g., carbon black or a black dye, in the processing composition which is distributed between silver halide layer 16 and support 24. It may be desirable to include a preformed opaque layer (not shown), e.g., a dispersion of carbon black in a polymer permeable to the processing composition, between a preformed light-reflecting layer 14 and the silver halide layer(s) 16. Such embodiments are shown and described, for example, in U.S. Pat. No. 3,594,165.

According to the present invention, the viscosity-increasing reagent employed in processing compositions for the development of such film units comprises a polymeric oxime, i.e., a polymer having at least one pendant or terminal substituent of the general formula:

(A)

This substituent may be linked to the polymeric backbone through various divalent radicals, e.g. aliphatic radicals such as alkylenes having, for example, 1–16 carbon atoms, arylene radicals of the benzene or naphthalene series, aralkylene, aliphatic or aromatic amides, etc., including substituted derivatives thereof.

The polymeric moiety is not critical, provided the resulting material is readily soluble and stable in the medium in which it is to be employed, e.g. in an aqueous alkaline processing composition medium.

As examples of such polymers which may, for instance, be homopolymers or copolymers, including grafts, mention may be made at the following:

(1)

(2)

(3)

(4)

(5)

(6)

(7)

Particularly useful are a class of novel polymers having a substituent of the general formula:

(B)

each $R^1$ is alkyl of 1–6 carbon atoms, preferably methyl or ethyl; "alkylene" is of 1–8 carbon atoms and may be straight or branched chain; $R^2$ is hydrogen, amino, phenyl or alkyl of 1–4 carbon atoms; and m is 1 or 2. Within this class of polymers, preferred are those wherein $R^2$ is methyl; m is 2; and "alkylene" has one carbon atom, i.e., is methylene.

As examples of novel polymeric oximes of formula (B), mention may be made of the following:

(8)

(9)

(10)

-continued (11)

(12)

(13)

(14)

In general, oximes (aldoximes or ketoximes) may be prepared in a simple reaction with hydroxylamine:

$$RCHO + NH_2OH \rightarrow RCH=N-OH + H_2O \quad (a)$$

$$R_2C=O + NH_2OH \rightarrow R_2C=N-OH + H_2O \quad (b)$$

The polymeric oximes of this invention may in some instances be prepared by first forming the oxime monomer by one of the above reactions and then polymerizing. However, in some instances, the desired polymer, e.g. one of the requisite molecular weight, cannot be prepared in this manner, in which event, it may be obtained by first forming the aldehyde or ketone polymer analogue and then oximating.

For instance, the novel polymers of formula (B) of high molecular weight have not been successfully obtained by polymerizing the oxime monomer. Instead, they were obtained by polymerization to form the polymeric aldehyde or ketone analogue:

(C)

and thereafter oximating to form the desired polymer of formula (B).

This latter reaction may be illustrated with reference to the compound of formula (8), poly-diacetone acrylamide oxime:

(Formula 8)

It will be appreciated that the aforedescribed oximation reaction can be conducted such that only a portion of the aldehyde or ketone groups available for oximation are converted to the oxime. Thus, partially oximated polymers can be suitably formed and degree of oximation may conveniently be utilized as a means for controlling polymer solubility in a desired medium, e.g., in an aqueous alkaline photographic processing composition.

The polymers of this invention, including the novel polymers of formula (B) may be homopolymers or copolymers, including graft polymers. For instance, the polymeric backbone may be a copolymer of an acrylamide with an alkali-soluble ethylenically unsaturated monomer such as acrylic acid, methacrylic acid, 2-acrylamido-2-methylpropanesulfonic acid, etc.

Examples of polymers of the invention include homopolymers of compounds having at least one substituent of the formula and copolymers with copolymerizable monomers. Thus, homopolymers include any of those described hereinbefore by reference to formulas (1) to (4) and (8) to (14), while copolymers include the copolymers of such compounds with at least one copolymerizable ethylenically unsaturated monomer, such as acrylic acid, methacrylic acid, 2-acrylamide-2-methylpropanesulfonic acid or the like. The copolymers will thus contain repeating monomeric units as shown in formulas (1) to (4) and (8) to (14) and repeating units derived from suitable ethylenically unsaturated copolymerizable monomers. Such polymers can be suitably prepared, for example, by resort to solution polymerization or emulsion polymerization techniques or by use of methods employed for the preparation of graft copolymers. Other polymeric oximes include those prepared by derivatization of polymeric materials such as polyvinyl alcohol or cellulosic polymers. Examples of such polymers are the oximated polyvinyl alcohol and cellulosic polymers set forth by formulas (5) to (7).

In the preparation of suitable copolymers of the invention, the nature of the copolymerizable ethylenically unsaturated monomer is not critical provided that the resulting copolymer is soluble and stable in the medium in which it is to be utilized, e.g., in an aqueous alkaline processing composition. A preferred copolymer of the invention is a copolymer of diacetone acrylamide oxime and acrylic acid which exhibits desirable solubility, viscosity and stability properties in aqueous alkali. As in the case of the preparation of the homopolymer (polydiacetone acrylamide oxime), it will be preferred to prepare a copolymer of diacetone acrylamide and acrylic acid, as by emulsion polymerization, and to, thereafter, effect the oximation reaction. It has been found that the preparation of a copolymer of diacetone acrylamide and acrylic acid by emulsion polymerization provides a polymerization product which is more soluble in water and more readily oximated than the corresponding homopolymer of diacetone acrylamide. The utilization of a copolymer of diacetone acrylamide oxime and acrylic acid, methacrylic acid or other copolymerizable monomer, thus, constitutes a preferred practice. Suitable polymers include those wherein the molar ratio of diacetone acrylamide oxime to acrylic acid, or other copolymerizable monomer, is in the range of from about 99:1 to about 1:1, for example 9:1.

As has been mentioned hereinbefore, the copolymers of the invention include graft copolymers. Graft copolymers can be suitably prepared by grafting a compound having a substituent of the formula onto a polymeric backbone material capable of being oxidized in known manner with formation of reactive sites for the grafting of the compound having the substituent Alternatively, a graft copolymer having an aldehyde or ketone group, i.e., a polymer having an oxime precursor group, can be first prepared, and thereafter, oximated to provide the desired oxime polymer, as is illustrated hereinafter. Thus, ethylenically unsaturated monomers, corresponding, for example, to those illustrated within the brackets of formulas (1) to (4) and (8) to (14) can be grafted onto a polymeric backbone material by oxidation in known manner with a transition metal ion catalyst. Any transition metal ion catalyst of a first oxidation state, having an oxidation potential in acidic solution of at least about one volt when the transition metal is reduced to the next lowest acidic solution stable oxidation state can be employed for this purpose. As preferred catalysts, mention may be made of transition from the group consisting of $V^{+5}$, $Ce^{+4}$ and $Cr^{+6}$.

Preferred graft copolymers are those having the formulae:

wherein each $R^1$ is alkyl of 1–6 carbon atoms; "alkylene" is of 1–8 carbon atoms and may be straight or branched chain; $R^2$ is hydrogen, amino, phenyl or alkyl of 1–4 carbon atoms; m is 1 or 2; Z is an organic polymeric backbone comprising repeating units having structural units capable of being oxidized by a transition metal ion catalyst of a first oxidation state, having an oxidation potential in acidic solution of at least about one volt when the transition metal is reduced to the next lowest acidic solution stable oxidation state; K is a monomer producing copolymers with M is equal to or greater than one; N is equal to or greater than zero; and each of Q, J and P is greater than one. It will be appreciated from inspection of the formulae for such graft copolymers that copolymerizable monomers of the K class can, thus, be grafted directly onto backbone polymer Z or attached to the acrylamide compound wherein $R^1$, $R^2$, m and alkylene have the meanings hereinbefore ascribed.

With regard to the backbone polymer, Z, of the graft copolymer, in general, any organic polymer having repeating units containing the grouping, wherein Y is selected from the group consisting of hydroxyl, amino, mercapto, acyl and aroyl, are capable of being oxidized by a transition metal ion catalyst as stated above, and are therefore useful in the present invention, provided that the resulting graft copolymer is soluble and stable in the medium in which it is to be utilized, e.g., in aqueous alkali. The terms hydroxyl, acyl and aroyl as used above are intended to encompass partial acetals of these particular functional group terms. Preferred backbones are substituted or unsubstituted cellulosic or polyvinyl polymers, and most preferably, a backbone of cellulosic polymer such as hydroxyethyl cellulose.

It is believed that upon oxidation of grouping of the backbone polymer, the free radical is formed which attacks the double bond of the vinylic oxime-containing monomer, thus initiating polymerization.

Suitable K class monomers include a variety of ethylenically unsaturated copolymerizable monomers. It will be appreciated that such monomers may be utilized provided that the particular monomers and proportions employed permit formation of a graft copolymer having solubility and stability in the medium in which it is to be applied, e.g., in an aqueous alkaline medium of a photographic processing composition. Among monomers which can be employed, mention may be made of 2-acrylamido-2-methylpropane sulfonic acid; acrylic acid, methacrylic acid, p-styrenesulfonamide; 2-acrylamido-2-methylpropionic acid; and trimethylamine acrylimide.

Particularly useful graft copolymers of the invention are the oximated grafts of diacetone acrylamide (DAA) onto a backbone polymer of hydroxyethyl cellulose (HEC). Such graft copolymers exhibit good stability in aqueous alkaline photographic processing compositions and permit rapid diffusion of dyes therethrough in a diffusion transfer process or product. Such graft copolymers are especially effective in compositions additionally containing pigment, e.g., titanium dioxide and-/or any of the aforementioned indicator dyes employed in such photographic systems to permit development in the light. The graft copolymers are effective in maintaining the proper uniform dispersion of such components in a photographic processing composition, thus, maintaining the stability of the processing composition. Photographic processing compositions containing the oximated HEC/DAA graft copolymers, apparently because of the capacity for such copolymers to effectively maintain dispersion of the pigment and opacification dye components thereof, have been found to be useful in diffusion transfer processes and products with the provision of transfer images free of the streaking or the like photographic defects occasioned as the result of inadequate dispersion of such components. The capacity of such graft copolymers to provide such dispersion of pigment and/or opacification dyes at levels permitting rapid diffusion of imaging dyes therethrough, e.g., 1% by weight of the photographic processing composition, makes such graft copolymers materials of choice where the combined properties of stability and rapid diffusion transfer are desired. An example of a preferred graft copolymer is a polymer wherein DAA and 2-acrylamido-2-methylpropane sulfonic acid (AMPS) are grafted onto a hydoxyethyl cellulose (HEC) polymer and the resulting polymer is subjected to oximation.

The following EXAMPLES 1 to 4 illustrate the preparation of oxime polymers of this invention.

EXAMPLE 1

450 cc of water were heated to 60° C. in a 3 N 1 liter flask fitted with a stirrer, condenser, thermometer, nitrogen inlet and heating bath 84.5 gms. of diacetone acrylamide:

were added and the resulting solution was flushed with nitrogen until the oxygen level was less than 0.1 ppm. With the temperature maintained at 60° C. 0.042 gm of 4,4'-Azo-bis-4-cyano-valeric acid (catalyst) was added as a water slurry and the resulting solution was stirred under a slight blanket of nitrogen. Within ten minutes the polymerization solution became turbid. The mixture was then stirred for an additional five minutes. The polymerization was allowed to remain at 60° C. for about twenty hours. The resulting solid polymer:

was then ground up with a Waring blender. It was next washed with water and filtered. [At this point, the polymer may be dried and stored for subsequent reaction or used immediately in the oximation reaction described hereinafter.] The solid wet polymer prepared above was dispersed in 2000 ml. of ethanol and heated on a steam cone to reflux. To the resulting mixture were added 34.75 gm. of NH$_2$OH.HCl. When it appeared that the hydroxylamine hydrochloride was dissolved, heating was stopped and 125 gm. of potassium hydroxide in a 45% aqueous solution were slowly added. After addition was complete, the mixture was brought to reflux and 500 ml. of water were added. Reflux was then continued for an additional two hours. The resulting mixture was them added to 10 liters of ice water while stirring. The solution was then heated on a steam cone to precipitate the polymer. (note: addition of sodium chloride facilitates the isolation of the polymer.) The solid polymer which precipitated was then isolated, ground and washed well with water to eliminate any salts that were found. It was ground in a Waring blender, to a 200 mesh particle size filtered, washed with water and dried under vacuum at 40° C. to yield 85 gms. of the polymer of formula (8):

EXAMPLE 2

100.0 g of freshly distilled methyl vinyl ketone were dissolved in 100 ml. of ethyl acetate in a three-necked flask equipped with a condenser, nitrogen inlet and a mechanical stirrer. 5.0 g of benzoyl peroxide were then added and the mixture was stirred for three hours at a temperature of 75° C. maintained by an oil bath. The resulting polymer solution was then precipitated in cyclohexane. The precipitated polymer was dissolved in ethyl acetate and reprecipitated in cyclohexane and dried under vacuum at 55° C. to obtain 95 gm. of poly (methyl vinyl ketone). A solution of 7.85 gm. of this polymer (0.112 mole), 7.5 gm. (0.112 mole) of hydroxylamine hydrochloride in a mixture of 100 ml. of p-dioxane and 20 ml. of ethanol was stirred under nitrogen. 10.1 gm. (0.123 mole) of sodium acetate was then added and the reaction mixture was stirred at room temperature for 24 hours. It was then heated at 60° C. for 45 minutes and the resulting white dispersion was poured into distilled water. The precipitated polymer was dissolved in methyl cellosolve, reprecipitated in distilled water, and then dried in vacuum at 45° C. to obtain 8.2 gm of the polymeric oxime of formula (1).

EXAMPLE 3

A solution of pure toluene-recrystallized diacetone acrylamide (477 g., 2.8 moles) in 1.5 liters of distilled water was suction filtered and the filtrate was transferred to a three-liter, four-necked, round-bottom flask, equipped with stirrer, nitrogen inlet tube, thermometer and condenser. Para-methoxyphenyl (0.005 g.), freshly distilled acrylic acid (20 g., 0.28 mole), 20% dialyzed Dowfax 2 A-1 emulsifier (10.6 g.) and distilled water (460 ml.) were added with stirring and the mixture was purged with nitrogen for one hour while being heated to 37° C. A solution of sodium bisulfite (0.010 g. in 2 ml. of deaerated water) was added, followed immediately by the addition of ammonium persulfate, (NH$_4$)$_2$S$_2$O$_8$, (0.10 g. in 2 ml. of deaerated water). After one minute, the stirrer was stopped and the nitrogen tube was raised above the liquid level. Within five minutes, a bluish emulsion was formed. The mixture was allowed to rest at 37° to 37.5° C. for an additional five minutes, whereupon, heating and stirring were resumed. At 40° C., the heating bath was removed and the speed of the stirrer was reduced to 30 rpm. The flask temperature reached its peak at 55° to 56° C., about 25 minutes later. Upon cooling to 35° C., a white emulsion, comprising the copolymer of diacetone acrylamide and acrylic acid, was filtered through cheesecloth. The major portion of the filtrate, 2050 g., containing 20 wt.% solids, was transferred to a 20-liter, three-necked flask and 11.8 l. of distilled water were added.

Oximation of the diacetone acrylamide/acrylic acid copolymer was effected by adding to the contents of the 20-liter, three-necked flask a mixture of hydroxylamine hydrochloride (163 g.) in 650 ml. of distilled water and 15 wt. % of KOH (980 g.) over a period of ten minutes. Then, 15 wt.% KOH (870 g.) was added rapidly and stirring of the increasingly viscous reaction mixture was continued at room temperature for five hours. A Brookfield viscosity reading was taken (Model LVT, spindle #3 at 6 rpm), indicating a viscosity of 6000–9000 cps. The copolymer was precipitated by acidification with approximately one liter of 10 wt.% hydrochloric acid (final pH 3.5) suction filtered, thoroughly washed with ten liters of distilled water and air-dried at 24° to 27° C. to a moisture content of 6 to 7 wt.%.

EXAMPLE 4

An oximated graft copolymer of the invention was prepared in the following manner:

To a solution of 60 g. of Natrasol 250 HH, Hercules Incorporated hydroxyethyl cellulose (prepared by slowly adding the hydroxyethyl cellulose (HEC) with good agitation to six liters of distilled water, allowing the HEC to swell for 15 minutes at room temperature, raising the temperature to 95° C., maintaining the temperature for about 15 minutes until formation of a clear solution and cooling the solution under nitrogen to 20° C.) were added, under nitrogen, 540 g. of diacetone acrylamide (DAA) and 3 g. 2-acrylamide-2-methylpropane sulfonic acid (AMPS). Upon dissolution of the monomers, the pH of the solution was adjusted to 1.5 by addition of concentrated nitric acid. After nitrogen purging had been continued over the solution for one hour, the temperature was raised to 50° C., at which temperature the oxygen level above the solution is about 0.1 ppm. Once the reaction temperature was reached, 24 g. of Dowfax 2A-1 emulsifier (20% dialyzed) was added and allowed to dissolve for several minutes whereupon 18 cc. of 0.1 M ceric ammonium nitrate solution was added. Stirring and heating were continued for three hours. At the end of this time, 4.8 liters of distilled water were added and a diacetone acrylamide residual monomer analysis was conducted. Residual diacetone acrylamide monomer content was in the range of 0.5 to 1.0 g./l., indicating a 97.9 to 98.9% conversion of monomer of polymer.

Oximation of the resulting graft copolymer of DAA and AMPS on HEC was effected by transferring the reaction mixture to a 50-liter, three-necked flask, and under nitrogen with stirring, adding 13.2 liters of water and 300 g. hydroxylamine hydrochloride. The suspension was stirred for ten minutes and 1330 g. of 45% KOH were added. After one hour, an additional 1330 g. of 45% KOH were added and stirring was continued approximately 18 hours at room temperature. Brookfield viscosity (Model LVT, Spindle #3 at 6 rpm) was 10,000 to 12,000 cps. The reaction mixture was acidified with 4% HCl to a pH of 3.5. Thereafter, (and rapidly so as to avoid hydrolysis of oxime), the reaction mixture was diluted, heated and cooled and filtered as follows. The reaction mixture was diluted with distilled water to approximately twice its volume. The temperature was raised to 55° C. with gentle stirring and the reaction mixture was cooled to 20° C. The resulting graft copolymer was filtered and air dried with recovery of 620 g. representing an overall yield of 97.2%. The viscosity of a 1% solution of the polymer in 11% potassium hydroxide solution was 70 cps (Brookfield LVT, #2 Spindle at 12 rpm).

The polymers of this invention may be employed in processing reagents in the same manner as were the previously known viscosity-increasing reagents, e.g. by preparing an aqueous alkaline composition including the polymeric oxime and any additional reagents performing specific desired functions.

The following EXAMPLES 5 to 7 illustrate the use of a processing composition of this invention with a film unit of the type disclosed in U.S. Pat. No. 3,415,644.

EXAMPLE 5

A film unit of FIG. 1 was prepared having a negative component comprising an opaque polyethylene terephthalate film base containing the following layers:
1. a layer of cyan dye developer;
2. A red-sensitive gelatino-silver halide emulsion;
3. A spacer layer;
4. A layer of magenta dye developer;
5. A green-sensitive gelatino silver indobromide emulsion;
6. A spacer layer;
7. A layer of yellow dye developer;
8. A blue-sensitive gelatino-silver iodobrimide emulsion; and
9. A gelatin overlayer; and a positive component comprising a transparent polyethylene terephthalate film base having the following layers:
   (1) a polymeric acid neutralizing layer;
   (2) a polymeric spacer or timing layer; and
   (3) a polymeric image-receiving layer or dyeable stratum.

The above two components were then laminated together to provide an integral film unit.

A rupturable container of known configuration and comprising an outer layer of lead foil and an inner liner or layer of polyvinyl chloride retaining an alkaline processing composition comprising the following proportions of ingredients:

| | |
|---|---|
| Water | 100.0 cc. |
| Polymer of Formula (8) | 2.50 gms. |
| N-phenethyl-α-picolinium bromide | 2.38 gms. |
| Benzotriazole | 1.50 gms. |
| Potassium hydroxide | 9.66 gms. |
| Polyethylene glycol (M.W. 6000) | 0.98 gms. |
| Colloidal Silica aqueous dispersion (30% SiO$_2$) | 0.98 gms. |
| Hydroxyethyl tricarboxymethyl ethylene diamine | 1.57 gms. |

-continued

| | |
|---|---|
| 4-amino-pyrazolo (3,4d) pyrimidine | 0.39 gms. |
| bis-2-amino-ethyl sulfide | 0.04 gms. |
| 6-methyl uracil | 0.40 gms. |
| Titanium dioxide | 74.09 gms |
| (56) | 2.69 gms. |
| (102) | 0.60 gms. | was then fixedly mounted on the leading edge of each of the laminates so that, upon application of compressive pressure to the container, its contents could be distributed, upon rupture of the container's marginal seal, between the dyeable stratum of the positive component and the next adjacent layer of the negative component.

The resulting film unit was then photoexposed to provide a developable image and then processed by passage between a pair of pressure rollers in known manner to rupture the container and thereby apply the processing fluid to provide a color transfer image viewable as a reflection print through the transparent support. Exposure and development in the light were accomplished with the "Polaroid SX-70 Land Camera".

The polymeric oximes contemplated by this invention are characterized as being highly stable and soluble in alkali. In addition, they will of course provide the requisite viscosity-increasing and film-forming functions.

The novel class of polymeric oximes affords certain additional potential advantages when employed in processing compositions. One such distinct potential advantage is that they possess a high pKa (about 12 or more) and will precipitate out of solution as the pH drops, e.g. at the lower pH typically obtained after development and image formation. This makes the applied layer of the polymer theoretically advantageous for inhibiting subsequent diffusion therethrough, e.g. from the negative component to the receiving layer, of any compounds, including dyes, which may adversely affect the image quality subsequent to the desired image formation and drop in pH from the alkalinity of the processing reagent, e.g. after acid neutralization typically employed in dye diffusion transfer systems. Although, it is correctly noted that these high pKa compounds have this "potential" or "theoretical" advantage, this has not been proven as yet.

Another signigicant advantage (which has been clearly demonstrated) occurs with those compositions including a pigment, for instance a titanium dioxide dispersion. In such compositions, sufficient viscosity-increasing film-forming reagent must be present to maintain the stability of the composition, e.g. to maintain the proper uniform dispersion of the titanium dioxide and/or any of the aforementioned indicator dyes present to permit development in the light. On the other hand, the use of such greater quantities may retard dye transfer therethrough.

It has been found, for example, that the processing composition formulation described above in Example 5 possesses the requisite stability. On the other hand, approximately 4.16 gms of carboxymethyl hydroxyethyl cellulose (CMHEC), as control would be required for the same stability with this particular formulation.

When the amount or rate of dye transfer of the formulation containing 2.5 gms. of the polymeric oxime of formula (8) was compared with a control composition employing 4.16 gms. of CMHEC in lieu of the oxime, very significant differences in the rate of dye transfer were observed. Thus, it may be stated that the polymeric oxime formulations provide the same stability or shelf life prior to use while providing more rapid dye transfer therethrough.

To illustrate this point further, a film unit as described in Example 5 was employed with the polymeric oxime formulation described therein and with a control using 4.16 gms. of CMHEC as the viscosity-increasing reagent in lieu of the oxime, hereinafter referred to as "Test" and "Control", respectively. In each instance, like film units were photo-exposed the processing compositions were applied, and the $D_{max}$ of transferred dye (cyan, magenta and yellow) was ascertained at various time intervals from 30 seconds to seven minutes.

These results appear in the follow Table I.

TABLE I

| | Test | | | Control | | |
|---|---|---|---|---|---|---|
| Time | Cyan | Magenta | Yellow | Cyan | Magenta | Yellow |
| 30 Seconds | .27 | .27 | .81 | .22 | .26 | .76 |
| 1 Minute | .30 | .40 | 1.24 | .20 | .32 | 1.17 |
| 1½ Minutes | .49 | .65 | 1.45 | .31 | .50 | 1.43 |
| 2 Minutes | .74 | .89 | 1.61 | .52 | .75 | 1.57 |
| 2½ Minutes | .95 | 1.11 | 1.74 | .74 | .95 | 1.71 |
| 3 Minutes | 1.12 | 1.28 | 1.81 | .96 | 1.17 | 1.78 |
| 4 Minutes | 1.33 | 1.57 | 1.98 | 1.20 | 1.46 | 1.88 |
| 5 Minutes | 1.46 | 1.74 | 2.03 | 1.35 | 1.64 | 1.88 |
| 6 Minutes | 1.55 | 1.87 | 2.14 | 1.50 | 1.87 | 2.05 |
| 7 Minutes | 1.64 | 1.99 | 2.22 | 1.58 | 1.95 | 2.08 |

In all instances, greater dye density at any given time interval was obtained with the polymeric oxime than with the control employed in amounts desired for composition shelf life. The comparative results were not particularly dramatic with the yellow dye which in the particular film unit (See FIG. 1) is in closest proximity to the receiving layer. However, the difference was most evident with the magneta and cyan dyes. For instance, the Test composition provided practically the same dye densities in 2.5 minutes as were obtained with the control in three minutes (about 16% quicker).

EXAMPLES 6 and 7

Alkaline processing compositions comprising the following ingredients were prepared and placed into rupturable containers, as described in Example 5, and comprising an outer layer of lead foil and an inner liner or layer of polyvinyl chloride:

|  | EXAMPLE 6 | EXAMPLE 7 | CONTROL |
| --- | --- | --- | --- |
| Water | 100 cc. | 100 cc. | 100 cc. |
| Polymer of EXAMPLE 3 | 1.40 gms. | — | — |
| Polymer of EXAMPLE 4 | — | 2.16 gms. | — |
| Carboxymethyl hydroxyethyl cellulose | — | — | 4.17 gms. |
| N-phenethyl-α-picolinium bromide | 2.57 gms. | 2.61 gms. | 2.66 gms. |
| Benzotriazole | 1.10 gms. | 1.12 gms. | 1.14 gms. |
| Potassium hydroxide | 10.39 gms. | 10.56 gms. | 10.77 gms. |
| Polyethylene glycol M.W. 4000) | 0.91 gm. | 0.92 gm. | 0.93 gm. |
| Colloidal Silica aqueous dispersion (30% $SiO_2$) | 3.72 gms. | 3.78 gms. | 3.86 gms. |
| Hydroxyethyl tricarboxymethyl ethylene diamine | 1.51 gms. | 1.53 gms. | 1.56 gms. |
| 4-amino-pyrazolo (3,4d) pyrimidine | 0.50 gm. | 0. 50 gm. | 0.52 gm. |
| 2(benzimidazolyl methyl) sulfide | 0.08 gm. | 0.08 gm. | 0.08 gm. |
| 6-methyl uracil | 1.41 gms. | 1.43 gms. | 1.46 gms. |
| Titanium dioxide | 75.50 gms. | 76.60 gms. | 78.2 gms. |
| Opacifier dye (formula 56 of EXAMPLE 5) | 2.72 gms. | 2.76 gms. | 2.82 gms. |
| Opacifier dye (formula 102 of EXAMPLE 5) | 0.60 gm. | 0.61 gm. | 0.62 gm. |
| 3,5-dimethyl pyrazole | 0.40 gm. | 0.40 gm. | 0.41 gm. |

Photographic units were prepared, photoexposed and processed. In each instance, the Dmax of transferred dye was ascertained at various time intervals from 30 seconds to seven minutes. Photographic results are shown in the following Table II.

TABLE II

| | Composition of EXAMPLE 6 ($D_{max}$) | | | Composition of EXAMPLE 7 ($D_{max}$) | | | Control Composition ($D_{max}$) | | |
| --- | --- | --- | --- | --- | --- | --- | --- | --- | --- |
| Time | Red | Green | Blue | Red | Green | Blue | Red | Green | Blue |
| 30 Sec. | 0.25 | 0.31 | 1.06 | 0.21 | 0.25 | 0.82 | 0.18 | 0.24 | 0.70 |
| 1 minute | 0.47 | 0.64 | 1.57 | 0.41 | 0.50 | 1.32 | 0.29 | 0.42 | 1.31 |
| 1½ minutes | 0.90 | 1.00 | 1.82 | 0.80 | 0.79 | 1.65 | 0.65 | 0.69 | 1.63 |
| 2 minutes | 1.22 | 1.27 | 1.96 | 1.11 | 1.03 | 1.80 | 0.95 | 0.94 | 1.81 |
| 2½ minutes | 1.53 | 1.57 | 2.04 | 1.34 | 1.23 | 1.90 | 1.18 | 1.15 | 1.92 |
| 3 minutes | 1.61 | 1.67 | 2.09 | 1.51 | 1.40 | 1.95 | 1.36 | 1.33 | 1.99 |
| 4 minutes | 1.84 | 1.87 | 2.14 | 1.76 | 1.62 | 2.04 | 1.60 | 1.59 | 2.07 |
| 5 minutes | 2.03 | 1.98 | 2.16 | 1.90 | 1.75 | 2.08 | 1.78 | 1.77 | 2.11 |
| 6 minutes | 2.16 | 2.04 | 2.16 | 2.04 | 1.84 | 2.08 | 1.90 | 1.83 | 2.12 |
| 7 minutes | 2.25 | 2.06 | 2.15 | 2.16 | 1.89 | 2.09 | 1.99 | 1.89 | 2.13 |

As was mentioned previously, included within the scope of this invention are novel polymeric oximes—e.g., the polymers of formula (B). While these polymers may be prepared in low molecular weight, at least in some instances, by polymerizing the desired oxime monomer, attempts to prepare the polymeric oxime of the higher molecular weight normally required to provide high viscosity in processing compositions, by known techniques were unsuccessful. Accordingly, the polymer of the requisite higher molecular weight ranges will normally be formed in the manner described, namely by polymerizing the aldehyde or ketone monomer analogue and then oximating.

This problem in polymerization may be illustrated by reference to diacetone acrylamide oxime (monomer). This compound is known in the art and is disclosed, for example, in French Pat. No. 1,540,185. Reference is also made in the literature in passing that it will not copolymerize with diacetone acrylamide. Thus, while diacetone acrylamide oxime is know, for example, there is no suggestion of polymers prepared therefrom. Attempts to polymerize this compound to prepare the polymer of formula (8) resulted in very low molecular weight homopolymers. All efforts to polymerize the monomer to form the high molecular weight homopolymer failed. This was accomplished only by the described method of polymerizing diacetone acrylamide and then oximating.

The particular molecular weight of the novel polymers of this invention may vary over a fairly wide range, namely from at least 100,000 to above one million. Thus, the values of n, M, N, Q, P and J will be as defined hereinbefore and such that the molecular weights of the polymers are generally within this range. The desired molecular weight range may be obtained by varying the amount of catalyst employed in the polymerization step and/or by the selection of the particular solvent employed. For instance, it is known in the literature that the less catalyst, the higher the molecular weight until you reach the lower limit where there is insufficient catalyst to carry out the polymerization reaction.

Thus, when diacetone acrylamide is polymerized in benzene, the resulting high polymer is soluble in organic solvents, and after oximation the resulting polymer is soluble in aqueous alkali and forms a true solution. If, however, the diacetone acrylamide is polymerized in water with low levels of initiator, the resulting polymer is not soluble in organic solvents but only swellable. After oximation, the polymer seems to dissolve in aqueous alkali but is believed in reality to be a pseudosolution consisting of highly swollen particles or a micro-sol. In this case, it is considered that the physical form of the polymer i.e., a pseudosolution or microsol, is more descriptive than a molecular weight in terms of being responsible for beneficial rheological and suspending properties at low solids.

Similar results may be obtained, for instance, from the emulsion polymerization of diacetone acrylamide as well as from graft copolymers of diacetone acrylamide on hydroxyl-containing polymers such as polyvinyl alcohol or hydroxyethyl cellulose.

From the foregoing description and illustrative examples, it will be seen that the invention provides novel viscous photographic processing compositions of applicability in photography in general. These compositions are of particular use in systems wherein a pigment or opacifying agent is included in the processing composition. The preferred polymeric oximes employed in the processing compositions of this invention are a particular class which are specifically novel polymers.

Since certain changes may be made in the above product and process without departing from the scope of the invention herein involved, it is intended that all matter contained in the above description shall be interpreted as illustrative and not in a limiting sense.

What is claimed is:

1. A polymer having at least one substituent of the formula wherein $R^1$ is alkyl having 1–6 carbon atoms; the alkylene moiety has 1–8 carbon atoms; $R^2$ is hydrogen, amino, phenyl or alkyl of 1–4 carbon atoms; and m is 1 or 2, said polymer having a molecular weight of at least 100,000.

2. A polymer as defined in claim 1 wherein said polymer is a micro-sol.

3. A polymer as defined in claim 1 wherein said polymer has a pKa of at least 12.

4. A polymer as defined in claim 1 wherein the polymer is a copolymer having repeating units of the formula wherein $R^1$ is alkyl having 1–6 carbon atoms; the alkylene moiety has 1–8 carbon atoms; $R^2$ is hydrogen, amino, phenyl or alkyl or 1–4 carbon atoms; and m is 1 or 2; and wherein said copolymer has repeating units from at least one ethylenically unsaturated copolymerizable monomer.

5. A polymer as defined in claim 4 wherein said ethylenically unsaturated copolymerizable monomer comprises acrylic acid.

6. A polymer as defined in claim 1 wherein the polymer is a graft copolymer of the formula:

wherein each $R^1$ is alkyl of 1–6 carbon atoms; the alkylene has from 1–8 carbon atoms; $R^2$ is hydrogen, amino, phenyl or alkyl of 1–4 carbon atoms; m is 1 or 2; Z is an organic polymeric backbone comprising repeating units having structural units capable of being oxidized by a transition metal ion catalyst of a first oxidation state, having an oxidation potential in acidic solution of at least about one volt when the transition metal is reduced to the next lowest acidic solution stable oxidation state; each K is a repeating unit from a monomer producing a copolymer with M is equal to or greater than one; N is equal to or greater than zero; and each of Q, J and P is greater than one.

7. A polymer as defined in claim 6 wherein said organic polymeric backbone Z is from hydroxyethyl cellulose; and said repeating units K are from 2-acrylamido-2-methylpropane sulfonic acid.

8. A polymer as defined in claim 1 having the formula:

wherein $R^1$ is alkyl having 1–6 carbon atoms; the alkylene moiety has 1–8 carbon atoms; $R^2$ is hydrogen, amino, phenyl or alkyl of 1–4 carbon atoms; and m is 1 or 2, said polymer having a molecular weight of at least 100,000.

9. A polymer as defined in claim 8 wherein said $R^2$ is methyl, said m is 2, and said alkylene is methylene.

10. A polymer as defined in claim 9 wherein each said $R^1$ is methyl.

11. A polymer as defined in claim 1 prepared by the process of oximating a polymer having at least one substituent of the formula:

wherein $R^1$ is alkyl having 1–6 carbon atoms; the alkylene moiety has 1–8 carbon atoms; $R^2$ is hydrogen, amino, phenyl or alkyl of 1–4 carbon atoms; and m is 1 or 2, said polymer having a molecular weight of at least 100,000.

12. A process for preparing an oximated polymer in the form of a micro-sol and having recurring substituents of the formula:

wherein $R^1$ is alkyl having 1–6 carbon atoms; the alkylene moiety has 1–8 carbon atoms; $R^2$ is hydrogen, amino, phenyl or alkyl of 1–4 carbon atoms; and m is 1 or 2, which comprises: polymerizing in water a monomer having a substituent of the formula wherein each of $R^1$, $R^2$, alkylene and m has the meaning described above, thereby to provide a polymer comprising recurring units having said substituents; and, thereafter, oximating said polymer, thereby to provide said oximated polymer in the form of said micro-sol.

13. The process of claim 12 wherein each of $R^1$ and $R^2$ is methyl, said m is 2 and said alkylene is methylene.

14. The process of claim 13 wherein said monomer polymerized in water is diacetone acrylamide.

* * * * *